United States Patent [19]

Ghinamo

[11] Patent Number: 4,519,139
[45] Date of Patent: May 28, 1985

[54] DEVICE FOR AUTOMATIC MARKING OUT AND DIVIDING UP OF A FLAT SHEET OF GLASS WHICH CAN BE POSITIONED UPSTREAM OF A SHEET CUTTING LINE

[75] Inventor: Leonardo Ghinamo, Boves, Italy
[73] Assignee: Bottero S.p.A., Cuneo, Italy
[21] Appl. No.: 616,015
[22] Filed: May 31, 1984

[30] Foreign Application Priority Data

Jun. 14, 1983 [IT] Italy ............... 67655 A/83

[51] Int. Cl.³ ............................... C03B 33/10
[52] U.S. Cl. .................... 33/32 C; 33/41 D
[58] Field of Search ............ 33/32 C, 41 R, 41 D, 33/44 Y

[56] References Cited

U.S. PATENT DOCUMENTS

| | | | |
|---|---|---|---|
| 2,423,504 | 7/1947 | Pierce | 33/41 D |
| 2,601,725 | 7/1952 | Henry | 33/32 C |
| 2,667,691 | 2/1954 | Marton | 33/32 C |
| 3,164,046 | 1/1965 | Arnaud | 33/32 C |
| 3,378,927 | 4/1968 | Lowery | 33/32 C |

Primary Examiner—Robert I. Smith
Attorney, Agent, or Firm—Handal & Morofsky

[57] ABSTRACT

The device consists of a platform for supporting the sheet of glass and a crosspiece which can move relatively with respect to the platform along a first axis and which carries a plurality of carriages movable thereon along a second axis perpendicular to the first and arranged to score the sheet along the said two axes by means of tools carried by the carriages; a plurality of first carriages disposed on a first side of the crosspiece for scoring the sheet along the first axis are displaced selectively by a second carriage which is movable on a second side of the crosspiece opposite the first to score the sheet along the second axis, the second carriage being served by actuating means and positioning means and carrying releasable engagement means for selectively coupling the first carriages and displacing them together with itself along the crosspiece.

11 Claims, 5 Drawing Figures

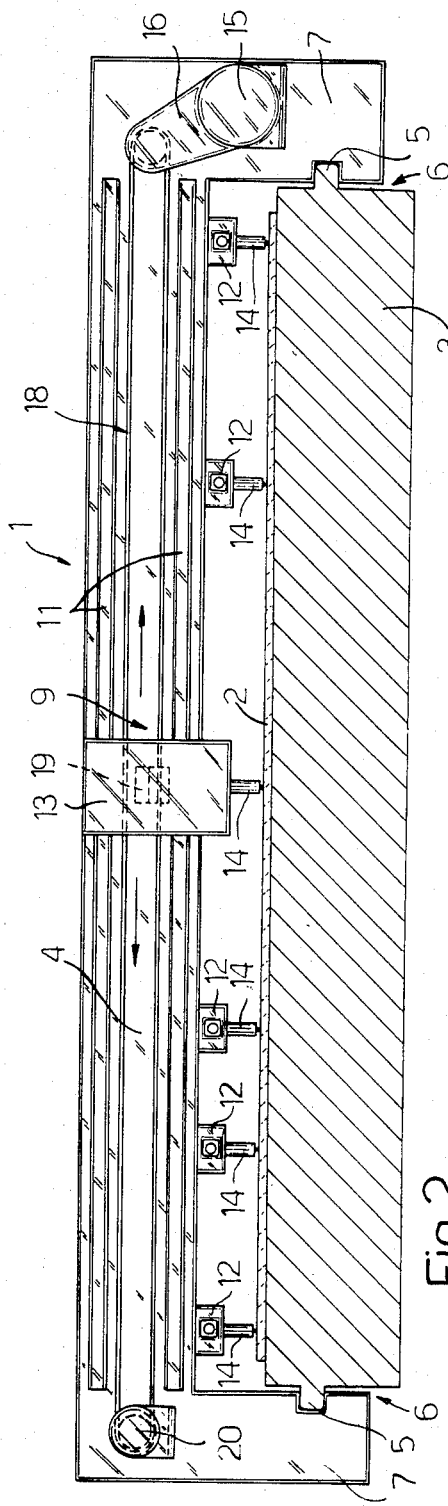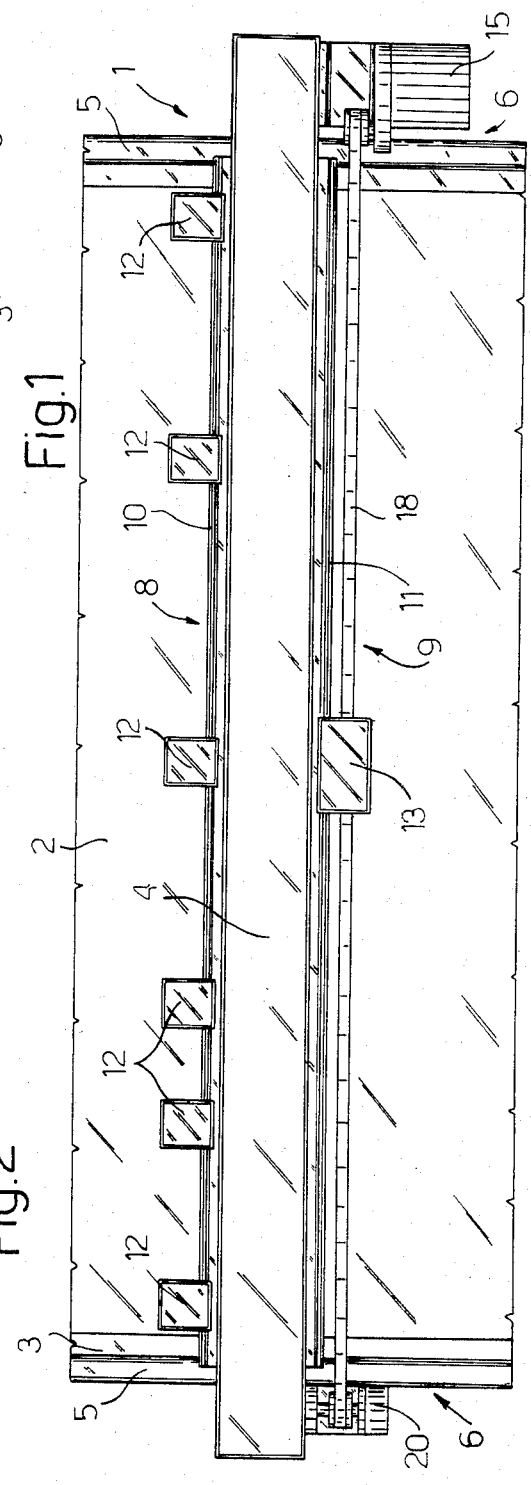

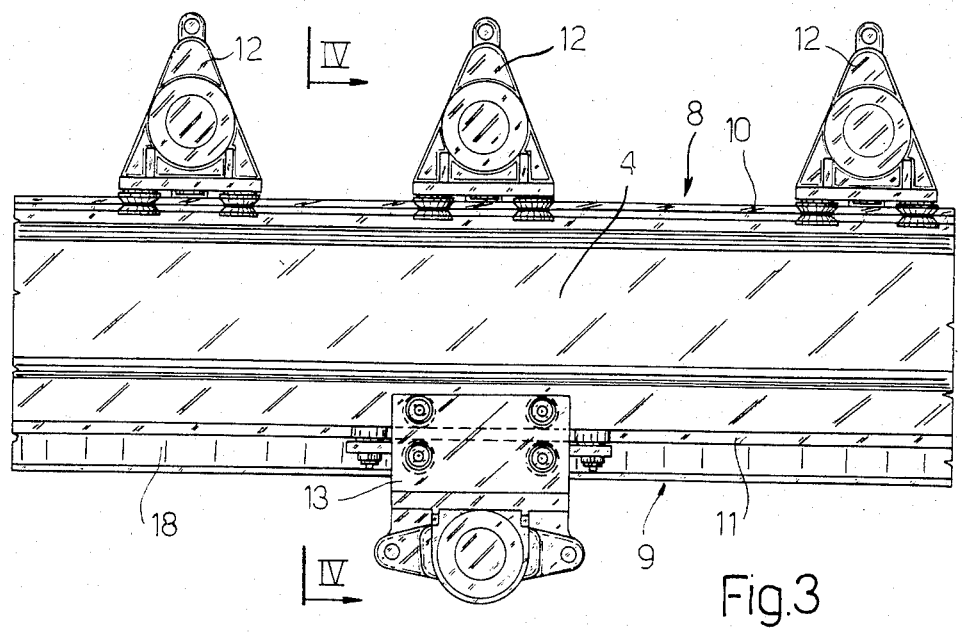
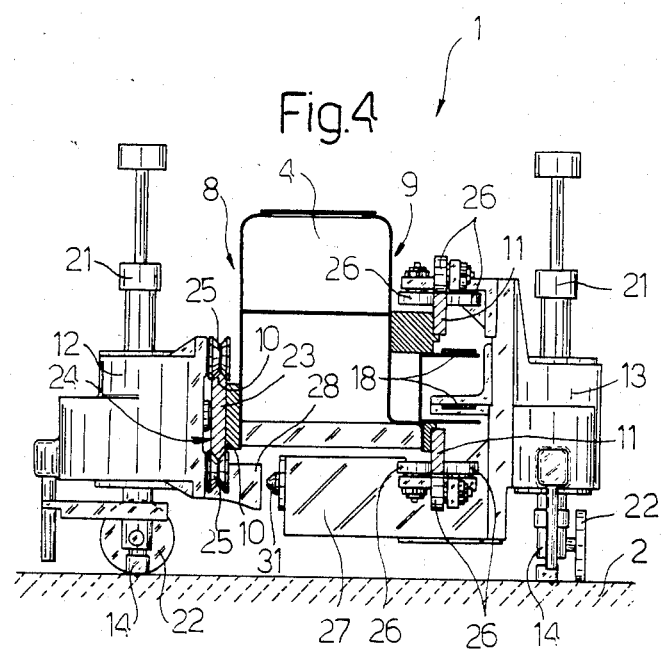

DEVICE FOR AUTOMATIC MARKING OUT AND DIVIDING UP OF A FLAT SHEET OF GLASS WHICH CAN BE POSITIONED UPSTREAM OF A SHEET CUTTING LINE

BACKGROUND OF THE INVENTION

The present invention relates to an automatic device for marking out and/or dividing up a flat sheet of glass, which can be positioned upstream of a sheet cutting line, for forming rectilinear incisions thereon.

Numerous devices for performing the marking out and/or dividing up of a sheet of flat glass before this is supplied to a sheet cutting line are known; the simplest known device is manually positioned and consists of a platform for supporting the sheet and over which there is movable, along a first axis, a crosspiece carrying a plurality of carriages slidable thereon along a second axis perpendicular to the first; the carriages are each provided with a suitable tool which can incise a score line in the sheet and are positioned manually on the crosspiece in such a way that, by making this latter move the tools can score rectilinear incisions on the sheet itself along the said two orthogonal axes. A second known device, similar to that described above, but operable automatically to perform the positioning and scoring operations on the sheet, conssists of a platform provided with a crosspiece carrying a plurality of carriages each provided with an incising tool, each of which carriages is provided with its own stepping motor controlled by a suitable central control unit. Of the two devices described above, the first has the disadvantage of not being able to position the tools automatically, and consequently has little flexibilty in use in that the times taken to set up the tool before commencing the operation itself are relatively long and it is necessary to repeat the setting up each time the type of work is changed; the second device on the other hand has the disadvantage of a high cost due to the necessity of providing each carriage with its own motor. There have also been proposed automatic marking out and/or dividing up devices which are provided with a single carriage movable along the crosspiece and which is able to perform all the incising operations; it is clear however that a carriage carrying a single tool can perform only a single incision at a time and therefore such a device takes a relatively long time to perform the work.

SUMMARY OF THE INVENTION

The object of the present invention is to provide a device of the type described above for marking out and/or dividing up a sheet of flat glass automatically, but free from the first mentioned disadvantages, and in particular one having high flexibility, low cost and capable of working in a reduced time.

The said object is achieved by the present invention in that it relates to a device for automatically marking out and dividing up a sheet of flat glass, in particular one which can be inserted upstream of a line for cutting the glass itself, for forming rectilinear incisions thereon, of the type comprising a support platform for the said sheet and at least one crosspiece movable with respect to the said platform along a first axis and carrying a plurality of carriages movable on the said crosspiece along a second axis perpendicular to the first and each provided with a respective tool which can incise the said sheet, first carriages being mounted slidably along the first guides on a first side of the said crosspiece for scoring incisions on the said sheet along the said first axis and a second carriage being mounted slidably along second guides on a second side of the said crosspiece, opposite the first, for scoring incisions on the said sheet along the said second axis, characterised by the fact that the said second carriage is provided with actuation means for displacing it along the said crosspiece and with positioning means for establishing at each instant the position of the said second carriage and stopping it in predetermined positions, and in that the said second carriage carries releasable engagement means operable to cooperate with respective coupling means of each said first carriage for selectively displaceing the first carriages along the said crosspiece together with the said second carriage.

BRIEF DESCRIPTION OF THE DRAWINGS

For a better understanding of the present invention a non limitative description of an embodiment thereof will now be given with reference to the attached drawings, in which:

FIGS. 1 and 2 respectively illustrate a plan view and a side view of the marking out and/or dividing up device formed according to the principles of the present invention;

FIG. 3 is a detail, on an enlarged scale, of the device of FIGS. 1 and 2;

FIG. 4 is a section taken on a line IV—IV of the detail of FIG. 3; and

DETAILED DESCRIPTION OF THE INVENTION

Figure 5:
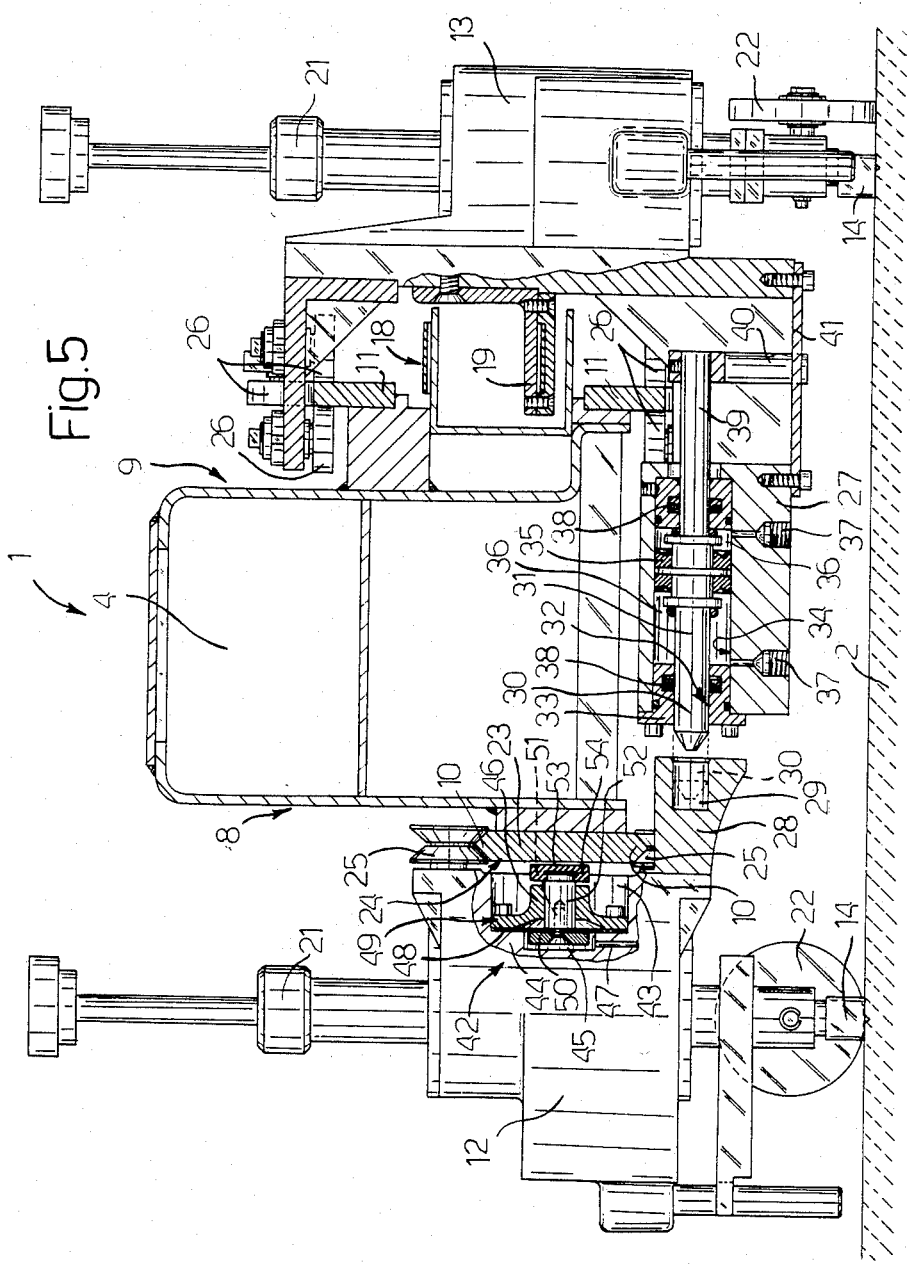
FIG. 5 illustrates on a further enlarged scale the section of FIG. 4 in greater detail.

With reference to FIGS. 1 and 2 the automatic device for marking out and/or dividing up a sheet of flat glass 2 is generally indicated with the reference numeral 1; in particular this device can be inserted upstream of a line for cutting the sheet 2, which is of known type and therefore not illustrated, for example of the snapping-off type; the marking out device acts to form preliminarily rectilinear incisions on the sheet 2 itself along two orthogonal axes operable to serve to determine the lines of breakage during the subsequent snapping operations. The device 1, like other known similar devices, comprises a support platform 3 for the sheet 2 and crosspiece 4 or "cutting bridge" movable over the platform 3 along a first axis defined by rectilinear guides 5 disposed along lateral sides 6 of the platform 3; the crosspiece 4 is provided with two opposite end l gs 7 wh ch engage the guides 5 and which maintain the crosspiece 4 in a position raised over the platform 3, and has two opposite longitudinal sides 8,9 each provided with respective rectilinear guides 10 and 11 parallel to the crosspiece 4 and rigidly connected thereto. The guides 10 carry a plurality of carriages 12 movable parallel to the crosspiece 4 along a second axis perpendicular to the said first axis defined by the guides 5, and the guides 11 carry a single carriage 13 also movable parallel to the crosspiece 4 along the said second axis. The carriages 12 and 13 are each provided with a respective tool 14 of known type and illustrated only schematically for simplicity, operable to score an incision on the sheet 2, and the carriage 13 is served by actuation means for displacing it along the crosspiece 4 and by positioning means for establishing at each instant the position of the carriage 13 itself and for stopping it in predetermined positions; in the nonlimitative example illustrated such means comprise a motor 15, preferably an electric stepping motor which drives, by means of a belt 16, a respective belt transmission 18 disposed parallel to the crosspiece 4 along the side 9 thereof, between respective guides 11, operable to cooperate with coupling means 19 for the carriage 13 for displacing this latter along the guides 11 in the direction of the arrows; one of the pulleys of the transmission belt 18 is mechanically connected to a pulse generator 20 (ENCODER) disposed coaxially with the said pulley and able to count and memorise the number of revolutions performed by this pulley during each translation of the carriage 13 in such a way as to establish the position of the carriage 13 itself at any instant along the crosspiece 4, according to a suitable previously memorised programme, and consequently to control, via a known central control unit not illustrated for simplicity, the operation of the motor 15 in order to be able to move the carriage 13 successively, and with high precision, to a series of previously memorised predetermined position. Such an arrangement for actuating one or more carriages of the cutting bridge of a marking out device of the type such as the device 1 is known and therefore will not be further described in detail.

As illustrated in FIGS. 3 and 4, each carriage 12 and 13 is provided with hydraulic actuator means 21 for positioning the tools 14 on the sheet 2 and is supported, as well as by the associated guides 10 and 11, by suitable support wheels 22 orientated along the axis of working movement of the associated carriage 12 or 13 which they support. In particular, the carriages 12 are able to form scored incisions on the sheet 2 along the said first axis parallel to the sides 6 and therefore the wheels 22 are disposed parallel to the guides 5, whilst the carriage 13 is able to form scored incisions on the sheet 2 along the said second axis orthogonal to the first and parallel to the crosspiece 4, and therefore the associated wheel 22 is orientated perpendicularly with respect to those of the support for the carriages 12; the guides 10 of these latter are defined by the opposite edges of a bar 23 rigidly connected to the crosspiece 4 and fixed on the side 8, parallel thereto, with its surface 24 facing the carriages 12, which are provided with conical rollers 25 cooperating with the guides 10. The guides 11 cooperate on the other hand with a set of rollers 26 for supporting the carriage 30 to guide it with precision and substantially without play parallel to the crosspiece 4.

Acoording to the invention, and as particularly illustrated in FIG. 5, the carriage 13 is provided underneath with a projecting element 27 extending beneath the crosspiece 4 towards the side 8 of this latter in such a way as to be located facing and in proximity to respective projections 28 of the carriages 12 whenever the carriage 13 is carried, as illustrated in FIG. 5, alongside one of the carriages 12; each projection 28 of each carriage 12 is provided with a recess 29, for example substantially cylindrical, disposed facing towards the side 9 of the crosspiece 4 and operable to receive within it one end 30 of a retractable pin 31 carried by the carriage 13 and lodged in the element 27 of this latter. In particular the pin 31 is movable axially in a housing 32 defined by a bush 33 operable to form a fluid tight seal in the end adjacent the carriage 12 of a cylinder 34 formed within the element 27 coaxially with the housing 32, which is therefore carried by the element 27 itself; within the cylinder 34 there is movable a piston 35 rigidly connected to the pin 31 and operable to separate the cylinder 34 into two opposed fluid tight chambers 36 each connected to a respective duct 37 operable to supply a fluid under pressure to the associated chamber 36 to make the piston 35 and, with it the pin 13 displace axially, this latter passes through the entire cylinder 34, which, by means of seals 38, can house at least the intermediate part of the pin 31 in a fluid tight manner, and moves in the housing 32 between a retracted position in which the end 30 does not engage the recess 29, and an extended position, displaced to the left with respect to the position illustrated in FIG. 5, in which, on the other hand, the end 30 enters the recess 29, as illustrated in broken outline in FIG. 5, thus rigidly connecting the carriage 13 to an associated carriage 12 located facing the carriage 13. Preferably one end 39 of the pin 31, opposite the end 30, is engaged by a peg 40 which in turn engages a groove not illustrated for simplicity, formed in a plate 41 fixed rigidly to the carriage 13, in such a way as to guide the movement of the pin 31.

Each carriage 12 is further provided with releasable stop means comprising a friction device 42 which can cooperate with the surface 24 of the bar 23; in particular the device 42 is housed in part within a recess 43 formed in a portion 44 of each carriage 12 facing the surface 24, and comprises an end cavity 45 of the recess 43 a flange element 46 housed within the recess 43 and operable to close the cavity 45 from the cavity 24, a duct 47 operable to supply fluid under pressure to the cavity 45, and a resiliently deformable membrane 48 sealed in a fluid tight manner between a shoulder 49 delimiting the cavity 45 and the flange element 46 pressed against it. To the membrane 48 is rigidly connected, by means of a ring 50 and an associated screw 51, a rod 52 slidably mounted through the flange element 46 and provided, on its end 53 facing the surface 24, with a pad 54 made of elastomeric material, for example rubber, which can cooperate with the surface 24 itself to frictionally lock the associated carriage 12 in any axial position along the crosspiece 4.

The operation of the device 1 described is as follows. After having introduced the positioning coordinates of the various carriages 12 into the known and not illustrated memorising central control unit forming part of the device 20 or connected in a known manner thereto, the motor 15 is started which, controlled by the central control unit of the device 20 starts to displace the carriage 13 according to a defined programme carrying it to a position facing one of the carriages 12; when the carriage 13 reaches the correct position this is detected by the central control unit thanks to the counting device 20, which therefore sends fluid under pressure to the chamber 36 nearest the said end 39 of the pin 31 in such a way as to displace the piston 35 towards the left, and with it cause the pin 31 to be displaced to its extended position; in such position the end 30 enters the recess 29 of the carriage 12 facing the carriage 13. At this point the central control unit connected or integral with the device 20 starts the motor 15 carrying the carriage 13 and, with it, the associated carriage 12 connected to it, in correspondence with first predetermined coordinates in correspondence with which this said central control unit orders the carriage 13 to release the carriage 12; such operations are performed by sending fluid under pressure to the chamber 36 facing the bush 33 therefore making the pin 31 displace to the retracted position and thus releasing the carriage 12 which had previously been fixed to the carriage 13; simultaneously the carriage 12, thus carried to the desired position, can be locked in the said position by actuating the device 42 by sending fluid under pressure into the cavity 45 in such a way as to cause deformation of the membrane 48 and with it a displacement of the rod 52 which carries the pad 54 to cooperate with a predetermined pressure against the surface 24. At this point the carriage 13 is positioned alongside a second of the carriages 12 and the operations described above are repeated in such a way as to bring these latter to the desired positions and to lock them there by actuation of the respective device 42; by successively repeating the operations described above it is clear that all the carriages 12 can be disposed in the desired positions; having terminated this positioning operation it is sufficient to lower the tools 14 of the carriages 12 and the crosspiece 4 to produce a plurality of parallel scored incisions on the sheet 2 along the said first axis; in the desired positions, by momentarily stopping the crosspiece 4 and moving the tool 14 of the carriage 13 it is possible then to form also all the required incisions along the said second axis by making the carriage 13 displace along the crosspiece 4 maintaining the pin 31 in the retracted position.

From what has been described the advantages of the present invention will be apparent. Thanks to this invention it is in fact possible to form a device for marking out and/or dividing up a sheet of flat glass automatically in such a way as to rapidly perform the work on the sheet itself, which can be positioned rapidly and which is of low cost; in substance the device according to the invention allows all the advantages of known marking out and/or dividing up devices in which each carriage is provided with its own motor to be obtained, with a greater constructional simplicity and a significant saving in that only a single motor, in particular the motor of the carriage 13, is sufficient for moving and positioning all the carriages of the cutting bridge. Finally, it is clear that since there is only a single motor to be controlled it is only necessary to have a single counting device and therefore that the central control unit of this latter can be significantly simplified.

From what has been described it is finally clear that variations and modifications to the device according to the present invention can be introduced without departing from the scope of the invention itself. For example the crosspiece 4 can be fixed and the platform 3 movable.

I claim:

1. A device (1) for automatically marking out and dividing up a sheet of flat glass (2), in particular one which can be introduced upstream of a line for cutting the glass (2) itself, for forming rectilinear incisions thereon, of the type comprising a support platform (3) for the said sheet (2) and at least one crosspiece (4) relatively movable with respect to the said platform (3) along a first axis carrying a plurality of carriages (12,13) movable on the said crosspiece (4) along a second axis perpendicular to the first and each provided with an associated tool (14) for forming scored incisions on the said sheet (2), first carriages (12) being slidably mounted along first guides (10) on a first side (18) of the said crosspiece (4) for scoring the said sheet (2) along the said first axis and a second carriage (13) being slidably mounted along second guides (11) on a second slide (9) of the said crosspiece (4), opposite the first, for scoring the said sheet (2) along the said second axis, characterised by the fact that the said second carriage (13) is provided with actuation means (15) for displacing it along the said crosspiece (4) and with positioning means (20) for establishing at each instant the position of the said second carriage (13) and stopping it in predetermined positions, and in that the said second carriage (13) carries releasable engagement means (31) operable to cooperate with associated coupling means (29) for each said first carriage (12) for selectively displacing the first carriages (12) along the said crosspiece (4) together with the said second carriage (13).

2. A device (1) according to claim 1, characterised by the fact that each said first carriage (12) is provided with releasable stop means (42) for locking the said carriage (12) rigidly to the said crosspiece (4) in any predetermined axial position along the said second axis.

3. A device (4) according to claim 1, characterised by the fact that the said releasable engagement means comprise a pin (31) axially movable, in a housing (32) carried on an element (27) of the said second carriage (13) and facing towards the said first side (8) of the crosspiece (4), between an extended position in which it engages the said coupling means (29) and a retracted position in which it is released from these latter, and means (35) for displacing the said pin (31) in the said housing (32) and for locking it selectively in the said extended or retracted position.

4. A device (1) according to claim 3, characterised by the fact that the said means for displacing and locking the said pin comprise a cylinder (34) disposed coaxially of the said housing (32) and operable to contain at least part of the said pin (31) in a fluid tight manner, a piston (35) movable in the said cylinder (34) and rigidly fixed to the said pin (31) operable to sub-divide the said cylinder (34) into two opposite fluid tight chambers (36), and two associated ducts (37) operable to supply a fluid under pressure selectively to the said chambers (36) to make the piston (35) displace.

5. A device (1) according to claim 4, characterised by the fact that the said cylinder (34) is formed within the said element (27) of the said second carriage (13) which element (27) is disposed thereon projecting beneath the said crosspiece (4) and extending towards the said first side (8) of this latter.

6. A device (1) according to claim 3, characterised by the fact that the said coupling means comprise, for each said first carriage (12) a recess (29) disposed facing the said second side (9) of the crosspiece (4) and operable to receive one end (30) of the said pin (31) when this latter is in its extended position.

7. A device (1) according to claim 2, characterised by the fact that the said releasable stop means (42) comprise, for each said first carriage (12) friction means (54) for cooperating with the said first guide (10) to stop the associated first carriage (12), and thrust means (48) for maintaining the said friction means (54) against the said first guide (10) with a predetermined pressure.

8. A device (1) according to claim 7, characterised by the fact that the said friction means comprise a pad (54) of elastomeric material mounted on one end (53) of a rod (52) movable axially and operable to cooperate with a surface (24) of a bar (23) rigidly connected to the said crosspiece (4) and carrying the said first guide (10).

9. A device (1) according to claim 8, characterised by the fact that the said thrust means include a deformable membrane (48) enclosed in a fluid tight manner between a cavity (45) and a locking flange element (46) operable to close the said cavity (45), and a duct (47) operable to supply fluid under pressure into the said cavity (45) to difform the said membrane (48), this latter carrying the said rod (52), rigidly connected thereto, which rod is mounted slidably through the said flange element (46).

10. A device (1) according to claim 1, characterised by the fact that the said actuation means include a stepping motor (15) and transmission means (18) for transmitting the movement of the motor (15) to the said second carriage (13).

11. A device (1) according to claim 10, characterised by the fact that the said positioning means include a central control unit for the said motor and a pulse generator device (20) connected to the said actuation means (15).

* * * * *